(12) United States Patent
Dijkstra

(10) Patent No.: US 12,496,116 B2
(45) Date of Patent: Dec. 16, 2025

(54) ELECTROSURGICAL GENERATOR HAVING AN INVERTER

(71) Applicant: OLYMPUS WINTER & IBE GMBH, Hamburg (DE)

(72) Inventor: Jelle Dijkstra, Berlin (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 732 days.

(21) Appl. No.: 17/884,856

(22) Filed: Aug. 10, 2022

(65) Prior Publication Data

US 2023/0069467 A1 Mar. 2, 2023

Related U.S. Application Data

(60) Provisional application No. 63/237,408, filed on Aug. 26, 2021.

(51) Int. Cl.
*A61B 18/12* (2006.01)
*A61B 18/00* (2006.01)

(52) U.S. Cl.
CPC ............ *A61B 18/1206* (2013.01); *A61B 2018/00642* (2013.01); *A61B 2018/0072* (2013.01);
(Continued)

(58) Field of Classification Search
CPC .... G01R 15/146; H02M 1/0009; H02M 1/08; H02M 3/33507
(Continued)

(56) References Cited

U.S. PATENT DOCUMENTS

2010/0179619 A1* 7/2010 Gray .................. A61B 90/04
607/63
2010/0231187 A1 9/2010 Wicht et al.
(Continued)

FOREIGN PATENT DOCUMENTS

DE   10 2009 012 767 A1   9/2010
DE   10 2015 226 430 A1   6/2017
JP         2011120325 A  *  6/2011

OTHER PUBLICATIONS

JP_2011120325_Translation (Year: 2025).*

*Primary Examiner* — Michael F Peffley
*Assistant Examiner* — Nicholas S Borsch
(74) *Attorney, Agent, or Firm* — Oliff PLC

(57) ABSTRACT

An electrosurgical generator for generating a high-frequency AC voltage for an electrosurgical instrument, having a high-voltage inverter that generates and outputs a high-frequency AC voltage. A filter having a parallel capacitor is on an output line. A measuring sensor circuit having a current divider, which has a capacitive coupling to a series-connected shunt as bypass with respect to the parallel capacitor, and having a voltage detection circuit connected to the shunt. The shunt has a considerably lower impedance than the capacitive coupling. This gives rise to a proportional ratio between the current flowing through the parallel capacitor on the output line of the electrosurgical generator and the current through the shunt. This current is converted into a voltage, which is detected. The current at the output of the inverter is determined quickly and accurately thanks to the proportional relationship. This may be used for feedback and improved monitoring and regulation.

14 Claims, 2 Drawing Sheets

(52) U.S. Cl.
CPC ............... *A61B 2018/00767* (2013.01); *A61B 2018/00892* (2013.01)

(58) Field of Classification Search
USPC .................................................... 606/32, 41
See application file for complete search history.

(56) References Cited

U.S. PATENT DOCUMENTS

| | | |
|---|---|---|
| 2017/0179835 A1 | 6/2017 | Herbert et al. |
| 2017/0209202 A1 | 7/2017 | Friedrichs et al. |

* cited by examiner

ELECTROSURGICAL GENERATOR HAVING AN INVERTER

The invention relates to an electrosurgical generator that is designed to output a high-frequency AC voltage to an electrosurgical instrument. It comprises a DC voltage supply and a high-voltage inverter that is fed from the DC voltage supply and generates a high-frequency AC voltage that is applied at an output for the connection of the electrosurgical instrument.

In electrosurgery, high-frequency AC current is used in particular to cut or slice through tissue and to excise body tissue within the meaning of a thermal resection (what is known as an electrical scalpel). The operating principle is based on heating the tissue to be cut. One advantage of this is that, at the same time as the cutting, it is also possible to stem bleeding by closing the affected vessels (coagulation). Quite considerable powers are required for this purpose, specifically at frequencies of 200 kHz or higher up to 4000 kHz, typically around 400 kHz. Body tissue behaves like an ohmic resistance at these frequencies. However, the specific resistance is strongly dependent on the type of tissue, meaning that the specific resistances of muscles, fat or bones differ greatly from one another, specifically by up to a factor of 1000. This means that, during operation, the load impedance of the electrical scalpel may change quickly and greatly depending on the tissue to be cut, starting from virtually infinite when bringing the instrument toward the tissue as far as a virtual short circuit. This places specific and unique requirements on the electrosurgical generator and in particular its high-voltage supply that do not occur in this way in other technical fields. There is in particular a need for fast voltage control, in an environment containing high voltages in the range of a few kilovolts and high frequencies in the range from typically between 200 kHz and up to 4 MHz.

Depending on the tissue and the resulting impedance, the currents vary between a few milliamperes and several amperes, specifically in a highly dynamic manner within a very short time. The waveform of the AC voltage that is output may be continuously sinusoidal or may be modulated with a crest factor of up to 10 at modulation frequencies of up to around 20 kHz.

In order to meet these unique requirements, electrosurgical generators are typically structured such that they have an inverter for supplying power to the electrosurgical instrument, to which rectified current from the grid is supplied with a different voltage. The inverter is in turn typically designed as a freely oscillating single-ended generator having an LC resonant circuit. This structure is proven. However, the waveform that it actually outputs is difficult to control. However, modern, advanced types of use, such as those involving predetermined modes and/or predetermined waveforms, require this. In this case, the previous structure of electrosurgical generators reaches its performance limits.

In other fields, for example audio amplifiers, it is known, as power stage, to provide inverters that are structured in accordance with digital amplifier technology, what are known as class D amplifiers. The problem with these is the power loss arising in the power semiconductors at the required high switching frequency and voltage amplitude. Precise regulation is necessary in order to avoid an overload. It has also been considered to provide multilevel inverters. The switching frequency and the switching voltage of the power semiconductors in these are lower, but they are still high at the frequencies required for electrosurgery. Like class D amplifiers, they also offer the advantage that the output waveforms are able to be defined largely freely. However, for both topologies, a filter, typically an LC filter as low-pass filter, is required in order to isolate the useful frequency from the switching frequency. This filter however creates a risk of the occurrence of undesirable resonance, in particular at an output with low load. In this case too, there is a need for improved regulation, this requiring fast measurement in relation to what the high-frequency generator actually outputs at its output.

The invention is based on the object of improving an electrosurgical generator of the type mentioned at the outset with regard to its operating behavior, specifically through improved measurement at the output.

The solution according to the invention lies in the features of the independent claim. Advantageous developments are the subject of the dependent claims.

In the case of an electrosurgical generator that is designed to output a high-frequency AC voltage to an electrosurgical instrument, comprising a DC voltage supply and a high-voltage inverter that is fed from the DC voltage supply and generates a high-frequency AC voltage having a variable voltage, preferably also a variable frequency, which is channeled, via an output line, to an output for the connection of the electrosurgical instrument, and a filter having a parallel capacitor and a measuring sensor for current and/or voltage generated by the inverter are provided on the output line, provision is made, according to the invention, that the measuring sensor is configured as a measuring sensor circuit having a current divider that has a capacitive, preferably bipolar, coupling to a series-connected shunt as bypass with respect to the parallel capacitor, and is connected to a voltage detection circuit to the input of which the shunt is connected, wherein the shunt has a considerably lower impedance than the capacitive coupling.

"Considerably lower" is understood to mean here that the (impedance) value at the frequency to be measured ("measured frequency", the frequency output by the inverter) differs by at least a power of ten, preferably by a power of two.

The core concept of the invention is the idea of obtaining an improved measured signal by way of an indirect measurement in a less complex manner. For this purpose, the invention makes provision for a measuring sensor circuit having a current divider that comprises a preferably bipolar capacitive coupling to a series-connected shunt. Since, according to the invention, the impedance of the capacitors of the capacitive coupling is chosen to be considerably greater than the impedance value of the shunt, this thus results in a proportional ratio between the current flowing through the parallel capacitor on the output line to the output of the electrosurgical generator and the current flowing through the shunt of the measuring sensor. Since this current is converted into a voltage and this voltage is detected, it is thus also possible to accurately determine the inverter current in a less complex but also very fast manner thanks to the proportional relationship. No amplifiers or buffer stores or buffers are required, but rather this may take place directly using analog passive elements. The invention is thus able to achieve a high signal speed and thus lower latency in the measurement. The measured signal for the current, converted into a voltage by the shunt, may readily be supplied directly to an optional analog-to-digital converter (AD converter), which in particular, in one structural combination, ensures fast and interference-free conversion into digital signals, which may then be used as desired for the further regulation in the context of a feedback system of the electrosurgical generator.

A further advantage of the measuring sensor circuit according to the invention is that it requires only a few components, and these are inexpensive passive components. It is able to be produced with little outlay, and still, or for precisely this reason, achieves particularly low latency.

Provision may optionally be made for a standalone current-to-voltage converter, which comprises the shunt and to the output of which the voltage detection circuit is connected, wherein the current-to-voltage converter is preferably configured as an analog converter.

The voltage detection circuit is expediently designed for differential voltage measurement. Interference and distortions caused by interspersions or other interfering signals may thereby be minimized. In the circuitry according to the invention, this may also be achieved using simple passive components, meaning that the advantages of both inexpensive and uncomplicated configuration are furthermore combined with high and fast performance. Advantageously, the shunt is for this purpose designed as a two-part voltage divider, the center tap of which functions as a reference for the differential voltage measurement, in particular for the common-mode voltage. This achieves the transition to an interference-free differential voltage measurement in a particular simple manner with little outlay.

It is expedient to connect an AD converter at output to the voltage detection circuit in order thus to be able to convert the measured signal into interference-insensitive digital signals close to the voltage detection circuit. It will be understood that, as an alternative to the AD converter, other types of output circuits may also be provided.

The voltage detection circuit is advantageously provided with a low-pass filter at its output. It is thereby possible to effectively eliminate interference, as occurs in particular as a result of switching signals in the power stage of an inverter, in particular multilevel inverter or class D amplifier, from the measured signal. This preferably takes place, in order to enable an undistorted detection, only downstream of the current divider with the shunt, but also prior to the signal being supplied to the downstream AD converter. The AD converter thus receives the signal that has already been adjusted, as a result of which interfering signal noise is avoided.

The shunt is expediently configured as an ohmic resistor, the resistance value of which is considerably lower than an impedance value of the capacitive coupling.

Provision may however also be made that the shunt is configured as a capacitive impedance. In this case, the impedance value of the capacitive impedance is expediently considerably lower than an impedance value of the capacitive coupling. This means that the desired proportionality between the current detected by the current divider and the actual current at the output is ensured.

A high-resistance resistor is preferably connected in parallel with the capacitive impedance, wherein the capacitive impedance, like the high-resistance resistor, is furthermore preferably divided into two and their center taps are connected. This makes it possible to achieve a differential measurement in a particularly expedient manner, wherein the reference point for the differential voltage measurement is stabilized through the connection of the respective center taps.

It is expedient for the voltage detection circuit to be configured to be free from amplifiers and/or buffers. This makes it possible to avoid active components, which reduces expenditure, on the one hand, and reduces the risk of amplifying interference or the occurrence of instabilities, on the other hand.

Advantageously, the filter is configured as an at least second-order low-pass filter, in particular as an LC filter the capacitive element of which is the parallel capacitor. Using the low-pass filter at the output, it is possible to filter out interference caused by the fast switching frequencies of the multilevel inverter or class D amplifier.

Since the capacitive element of the LC filter functions as parallel capacitor for the capacitive coupling of the voltage detection circuit according to the invention, it is thus possible to produce an accurate current divider with little extra outlay. The low-pass filter is preferably arranged on the output line, in particular close to the output of the inverter.

Provision is expediently made, for the output of the electrosurgical generator, for an active damping device that has a feedback system. This makes it possible to counter the risk of undesirable oscillations occurring at the output due to non-linear entities in the system or sudden changes of the load impedance (of the electrosurgical instrument). Using the active damping device, it is possible to achieve sufficient damping, specifically including in the case of higher-order output filters (second order or more), and without the undesirable losses that accompany passive damping measures. It is in particular thus possible not only to effectively counter the risk of undesirable oscillations at the output, but rather impulse behavior may also thereby be improved. The occurrence of resonance may thus be prevented even if no load (instrument) is connected at the output of the electrosurgical generator. The feedback system may in particular comprise signals output by the voltage detection circuit. The feedback system is preferably designed as a state feedback system, as a result of which the active damping device may in particular be matched to poles of the system.

Provision is furthermore advantageously made that an output signal from the damping device acts on the inverter, wherein the output signal from the damping device is preferably coupled into a drive system for driving inverter modules of the inverter or the class D amplifier. The output signal from the damping device may thereby act directly on the source in order thus to counter the occurrence of unwanted oscillations or unwanted impulse behavior to some extent.

It is furthermore pointed out that the measuring sensor circuit according to the invention may, in addition or as an alternative, also be configured as a current divider on another capacitor of the electrosurgical generator, for example on a capacitor of the DC voltage supply.

The invention is explained in more detail below with reference to the accompanying drawing on the basis of one advantageous exemplary embodiment. In the figures.

Figure 1:
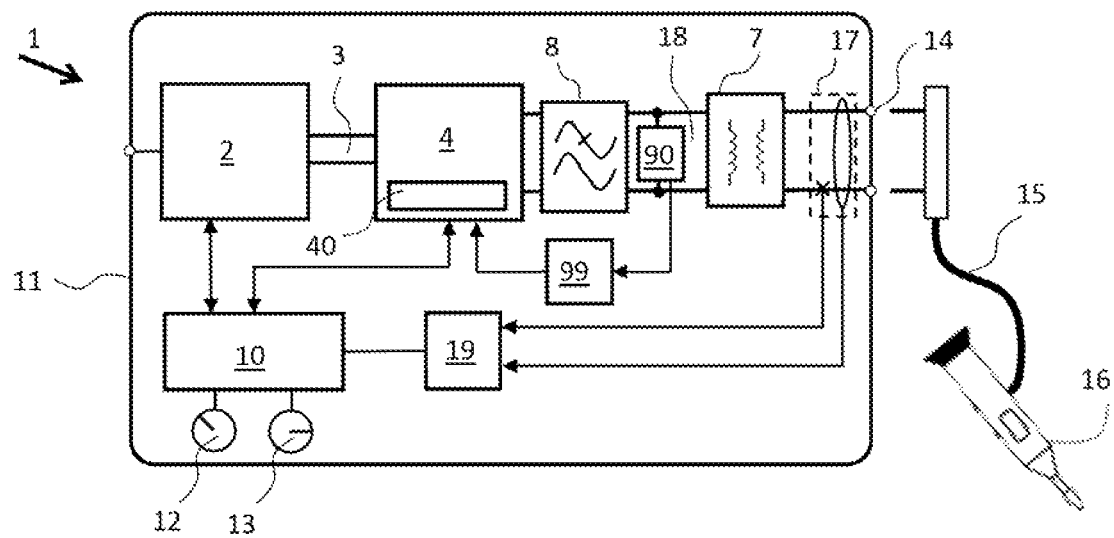
FIG. 1 shows a schematic illustration of an electrosurgical generator according to one exemplary embodiment with a connected electrosurgical instrument.

An electrosurgical generator according to one exemplary embodiment of the invention is illustrated in FIG. 1. The electrosurgical generator, referenced in its entirety with the reference numeral 1, comprises a housing 11 that is provided with a port 14 for an electrosurgical instrument 16. The instrument is an electrical scalpel in the illustrated exemplary embodiment. It is connected to the port 14 of the electrosurgical generator 1 via a high-voltage connection cable 15. The power output to the electrosurgical instrument 16 may be changed via a power controller 12.

In order to supply power to the electrosurgical generator 1, provision is made for a power supply unit 2, which is able to be connected, via a mains connection cable (not illustrated), to the public grid and is fed therefrom. The power supply unit 2 may be a high-voltage power supply unit (High Voltage Power Supply—HVPS). The power supply unit 2 comprises a rectifier and, in the illustrated exemplary embodiment, feeds a DC voltage supply 3, configured as a DC link circuit, with DC voltage the value of which is between 10 and around 500 volts, but is typically 48 volts in the illustrated embodiment. However, an inbuilt power supply unit is not necessary, meaning that the DC voltage supply may also be implemented by an external power supply unit, or provision is made for a direct DC feed, for example 24 volts in vehicles or 48 volts in stationary applications. The absolute value of the DC voltage may in particular depend on the set power, the type of electrosurgical instrument 16 and/or its load impedance, which in turn depends on the type of tissue being treated.

The DC voltage supply 3 feeds an inverter 4, which generates, from the supplied DC voltage, high-frequency AC voltage in the high-voltage range of a few kilovolts, at frequencies in the range between 200 kHz and 4 MHz, optionally starting from 30 kHz, in order thus also to be suitable for driving ultrasonic instruments. In the illustrated exemplary embodiment, the power and the voltage to be output are set using the inverter 4. In the illustrated exemplary embodiment, the inverter 4 is configured with the type of structure of a multilevel inverter. The inverter 4 has power semiconductor switches in the form of what are known as current valves, which are driven by an inverter controller 40 in a manner known per se, for example by way of known pulse width modulation as PWM control, in order to generate a high-frequency high voltage. The high-frequency high voltage generated by the inverter 4 is thus able to be set almost freely in terms of frequency and waveform. The high-frequency high voltage generated by the inverter 4 is output, via a low-pass filter 8, an output transformer 7 for the further voltage increase and an output line 18, at the port 14 for the connection of the electrosurgical instrument 16.

The voltage and current of the high voltage generated by the inverter 4 are furthermore measured by way of a voltage and current sensor 17 and the measured signals are supplied to a processing unit 19, which applies the corresponding data about the output voltage, current and power to an operating controller 10 of the electrosurgical generator 1. The power controller 12 is also connected to the operating controller 10. The operating controller 10 is furthermore designed to set various what are known as modes, which are typically stored voltage/time profiles, but may also be specifications regarding the waveform of the high-frequency high voltage to be output. Provision is made for a selection switch 13 for the user to select the mode.

The output-side low-pass filter 8 is configured as a second-order low-pass filter having a series inductor 81 and a parallel capacitor 82. The high-frequency high voltage thus filtered has its voltage stepped up by the output transformer 7 and is output, via the port 14, to the electrosurgical instrument 16 connected there. As may be seen particularly well in FIG. 2, the filtered high-frequency high voltage is also applied to the feedback system 9. The feedback system 9 comprises, as essential components, a capacitive coupling 91 and a shunt 92, connected in series therewith, as bypass with respect to the parallel capacitor 82. Provision is furthermore made for a voltage detection circuit 93 and a low-pass filter 94 that is connected upstream of an analog-to-digital converter 95. The digital output signal 97 therefrom is applied, via a state feedback system 99, to a differential member 98, which is connected into a control line between the operating controller 10 and the inverter 4 with its inverter controller 40.

Figure 2:
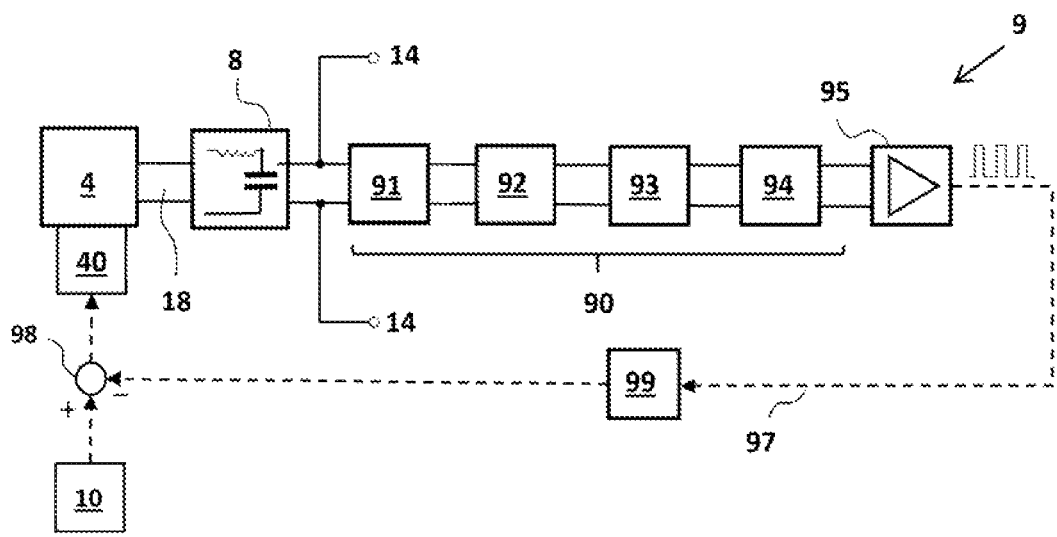
FIG. 2 shows a block diagram of a feedback system in the electrosurgical generator according to FIG. 1.
Figure 3:
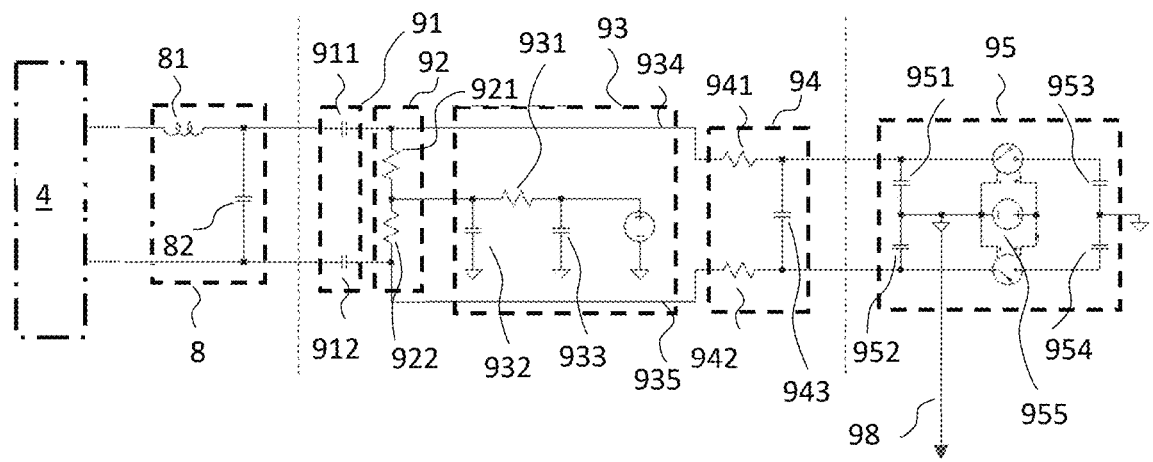
FIG. 3 shows an exemplary circuit diagram of a measuring sensor having a voltage detection circuit.

For a more detailed description, reference is now made to FIG. 2 and FIG. 3. FIG. 3, in the left-hand region, illustrates the inverter 4 and the low-pass filter 8 arranged at the output 14. The instrument 16 is connected thereto (see FIG. 1). The dashed vertical line on the left-hand side in FIG. 3 shows that the actual power portion of the electrosurgical generator ends here. A measuring sensor circuit 90 for the current flowing through the parallel capacitor 82 of the low-pass filter 8 is arranged to the right of this line. This comprises a capacitive coupling 91, the coupling being achieved using two capacitors 911, 912. These have a comparatively low capacitance in the low picofarad range, since only a low measurement current needs to flow through them. They interact with a shunt 92 connected in series with the capacitors 911, 912. The capacitors 911, 912 of the capacitive coupling and the shunt 92 thus form a bypass for the capacitor 82 of the low-pass filter 8. This may have a low (ohmic) resistance in terms of value, since only a low current flows in any case due to the low capacitance of the two capacitors 911, 912. The resistance of the shunt 92 is selected to be low enough that the impedance of the capacitors 911, 912 is considerably greater than the impedance of the shunt 92 (preferably at least five times, in particular ten times) at the frequency to be measured, that is to say that of the AC voltage generated by the inverter 4, in the range from typically 200 kHz (30 kHz if the ultrasonic range is also included) to 4 MHz. This circuit means that the current flow through the capacitors 911, 912 and the shunt 92 is proportional to the current flow through the parallel capacitor 82 of the low-pass filter 8. The low-resistance configuration of the shunt 92 also means that the measuring sensor formed by the capacitive coupling 91 and the shunt 92 has a low output impedance.

The sensor 92 is configured as an ohmic resistance, formed, in the exemplary embodiment according to FIG. 3, by two series-connected resistors 921, 922. The proportional current flow through the shunt 92 is converted, by the resistors 921, 922 of the shunt 92, into a voltage that is proportional to the current flow. The shunt 92 in this respect additionally functions as a current-to-voltage converter. Since the shunt 92 is designed with the two series-connected resistors 921 and 922, a circuit 93 for a differential voltage measurement may be connected to the center tap formed between them. This interacts with a downstream AD converter 95 and comprises an RC network having two grounded capacitors 932, 933, between which a resistor 931 is connected. A value of zero is thus generated as reference for the differential voltage measurement and applied to the center tap of the two series-connected resistors 921, 922 of the shunt 92. Signal lines 934, 935 for the differential voltage value thus determined are routed from the shunt 92 to a measuring low-pass filter 94 that is arranged at the input of the AD converter 95. The measuring low-pass filter 94 comprises, in each of the two signal lines 934, 935, a series resistor 941, 942, respectively, which are connected via a parallel capacitor 943. The signal lines 934, 935 are applied to differential inputs of the AD converter 95, and the voltage acting between them is determined by the converter core 955 and converted into a digital signal. (Parasitic) input capacitances of the AD converter 95 are symbolized by capacitors 951, 952, 953, 954. The digital signal thus determined for the measured voltage, which is a measure of the current through the parallel capacitor 82 at the output 14 of the electrosurgical generator 1, is output by the AD converter 95 via the signal line 97 as an interference-free digital signal and applied to the state feedback system 99, which is optionally designed as a P member with a presettable gain.

Figure 4:
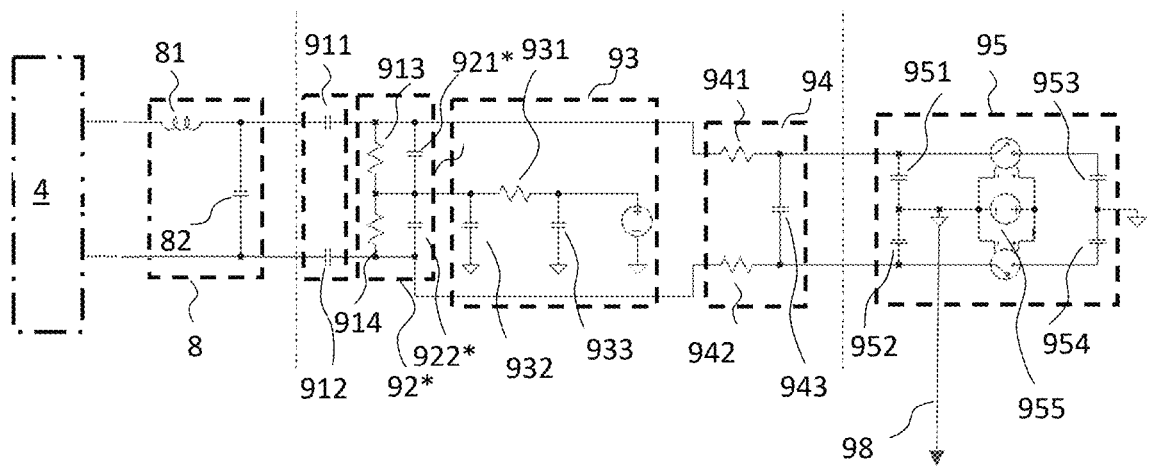
FIG. 4 shows an exemplary circuit diagram of a variant of a measuring sensor having a voltage detection circuit.

FIG. 4 illustrates a variant of the measuring sensor circuit having a voltage detection circuit. Elements of the same type and those having the same function are provided with the same reference numerals. The circuit differs from the one illustrated in FIG. 3 essentially in that it is not the current through the capacitor 82 of the low-pass filter 8 that is measured, but rather the voltage present there. The capacitive coupling 91 is configured in the same way as described above, with capacitors 911, 912 in the picofarad range. One difference however lies in the design of the shunt 92*. This now likewise has a capacitive configuration with two series-connected capacitors 921*, 922* with a high capacitance, which is in the nanofarad range in the illustrated exemplary embodiment. In the embodiment according to FIG. 3, provision is again made for a differential voltage measurement circuit 93, which is connected to a center tap of the shunt 92*. Two series-connected resistors 913, 914 are arranged in parallel with the capacitors 921*, 922*, the center tap of which resistors is likewise connected to the center tap between the capacitors 921*, 922*. These resistors 913, 914 have high-resistance values in the kiloohm range, meaning that they have a considerably higher impedance than the capacitors 921*, 922* of the shunt 92*. The voltage across the capacitors 921*, 922* of the shunt 92* is thus at a fixed ratio to the voltage at the parallel capacitor 82 of the low-pass filter 8. This is routed, in the manner described above in FIG. 3 for the signal lines 934, 935, to the measuring low-pass filter 94 and to the AD converter 95.

This creates a circuit designed with only a few simple components for determining the current or the voltage at the parallel capacitor 82 of the output 14 of the electrosurgical generator 1. The circuit requires (apart from the downstream AD converter 95 required for the conversion into a digital signal) no active components such as amplifiers or buffers, which not only saves on expenditure but also makes the circuit fast and reliable. As a further advantage, the circuit may establish low latency and a low output impedance, by way of which—without further drivers—a downstream differential AD converter 95 is able to be driven directly. It is thus possible, easily, reliably and with little outlay, to obtain current/voltage signals for the feedback system 9 for the improved control of the electrosurgical generator 1.

The invention claimed is:

1. An electrosurgical generator that is designed to output a high-frequency AC voltage to an electrosurgical instrument, comprising a DC voltage supply and a high-voltage inverter that is fed from the DC voltage supply and generates a high-frequency AC voltage having a variable voltage, which is channeled, via an output line, to an output for the connection of the electrosurgical instrument, and a filter having a parallel capacitor and a measuring sensor for generated current and/or voltage are provided on the output line, wherein the measuring sensor is configured as a measuring sensor circuit having a current divider that has a capacitive coupling to a series-connected shunt as bypass with respect to the parallel capacitor, and a voltage detection circuit to the input of which the shunt is connected, wherein the shunt has a considerably lower impedance than the capacitive coupling.

2. The electrosurgical generator as claimed in claim 1, wherein the voltage detection circuit is designed for differential voltage measurement.

3. The electrosurgical generator as claimed in claim 1, wherein the inverter is designed to generate the high-frequency AC voltage with a preselected amplitude and frequency.

4. The electrosurgical generator as claimed in claim 1, wherein the shunt is designed as a two-part voltage divider, the center tap of which functions as a reference for a differential voltage measurement.

5. The electrosurgical generator as claimed in claim 1, wherein the shunt is configured as an ohmic resistor, the resistance value of which is considerably lower than an impedance value of the capacitive coupling.

6. The electrosurgical generator as claimed in claim 1, wherein the shunt is configured as a capacitive impedance, the impedance value of which is considerably lower than an impedance value of the capacitive coupling.

7. The electrosurgical generator as claimed in claim 6, wherein a high-resistance resistor is connected in parallel with the capacitive impedance, wherein the capacitive impedance and the high-resistance resistor are divided into two and their center taps are connected.

8. The electrosurgical generator as claimed in claim 1, wherein the voltage detection circuit is configured to be free from amplifiers and/or buffers.

9. The electrosurgical generator as claimed in claim 1, wherein an AD converter is connected at output to the voltage detection circuit.

10. The electrosurgical generator as claimed in claim 1, wherein the output filter is configured as an at least second-order low-pass filter.

11. The electrosurgical generator as claimed in claim 1, wherein the voltage detection circuit is provided with a low-pass filter at its output.

12. The electrosurgical generator as claimed in claim 1, wherein provision is made, for the output of the electrosurgical generator, for an active damping device that has a feedback system.

13. The electrosurgical generator as claimed in claim 12, wherein an output signal from the measuring sensor circuit is applied to a state feedback system.

14. The electrosurgical generator as claimed in claim 13 wherein an output signal from the damping device acts on the inverter.

* * * * *